*amplitude modulation*

March 28, 1944.　　　G. W. WILLARD　　　2,345,441

LIGHT MODULATING APPARATUS AND METHOD

Filed Dec. 2, 1942　　　2 Sheets-Sheet 1

INVENTOR
G. W. WILLARD
BY
*G. F. Heuerman*
ATTORNEY

March 28, 1944. G. W. WILLARD 2,345,441
LIGHT MODULATING APPARATUS AND METHOD
Filed Dec. 2, 1942 2 Sheets-Sheet 2

INVENTOR
G. W. WILLARD
BY
*G. F. Heuerman*
ATTORNEY

Patented Mar. 28, 1944

2,345,441

UNITED STATES PATENT OFFICE 2,345,441

LIGHT MODULATING APPARATUS AND METHOD

Gerald W. Willard, Fanwood, N. J., assignor to Bell Telephone Laboratories, Incorporated, New York, N. Y., a corporation of New York Application December 2, 1942, Serial No. 467,650

16 Claims. (Cl. 179—100.3)

This invention relates to apparatus for and a method of modulating light and particularly to an apparatus and method making use of an ultrasonic light modulating means for producing a push-pull, variable density sound record upon a sound motion picture film.

In accordance with the invention there is provided an improved ultrasonic light modulator and particularly an ultrasonic light modulating arrangement for producing a push-pull, variable density sound record upon a light sensitive film, the film being moved continuously with respect to the modulated light beam which is directed upon it.

There is disclosed in my Patent No. 2,287,587, granted June 23, 1942, a light valve of the ultrasonic type and it is stated therein that either the undiffracted light is intercepted and only the diffracted light transmitted, or, conversely, the diffracted light is intercepted and only the undiffracted light is transmitted. In producing a push-pull, variable density sound record in accordance with the present invention, a portion of the diffracted light and a portion of the undiffracted light are simultaneously transmitted by the light modulating device, one portion of the sound track on the film being exposed to the transmitted diffracted light and another portion of the sound track being simultaneously exposed to the transmitted undiffracted light to produce the push-pull record. As the amplitude of the modulating voltage increases, the intensity of the diffracted light reaching the film increases while the intensity of the undiffracted light reaching the film decreases. Thus, the density of the portion of the developed film negative which was exposed to the diffracted light increases and the density of the portion of the negative which was exposed to the undiffracted light decreases as the amplitude of the modulating voltage is increased, and vice versa.

In accordance with a specific embodiment of the invention herein shown and described for the purpose of illustration, there is provided an ultrasonic cell, such as is disclosed in my Patent No. 2,287,587, for example, the piezo-electric crystal of which is set into vibration under control of a signaling electromotive force to set up compressional waves in the transparent liquid or other wave propagating medium in the cell. Light from a source of constant intensity illuminates an entrance aperture plate having light transmitting apertures therein and the light transmitted through these apertures is directed through the liquid in the ultrasonic cell in a direction substantially parallel to the wave fronts of the compressional waves set up therein due to the vibration of the piezoelectric crystal. The piezoelectric crystal is set into vibration by impressing upon its electrodes an alternating electromotive force having a high frequency to which the crystal is resonant, this electromotive force being modulated with respect to amplitude by a signaling electromotive force. The portion of the cell through which light is directed is limited in the direction of compressional wave propagation to a dimension which is small with respect to one-half wave-length of the highest frequency of the modulating electromotive force. There is also provided an exit aperture plate having an aperture therein through which a part of the light from the ultrasonic cell passes to reach the motion picture film to produce a record thereon. A first portion of the entrance aperture plate on one side of a plane through the ultrasonic cell parallel to the light beam and perpendicular to the wave fronts of the compressional wave in the cell has a bar separating two light transmitting apertures, while the portion on the opposite side of the plane has a slit aperture in alignment with the bar of the first portion. The exit aperture plate has a slit aperture upon which the bar and slit of the entrance aperture are imaged when there is no compressional wave in the cell so that the image of the bar is coincident with one-half of the exit slit and the image of the slit of the entrance aperture plate is coincident with the other half of the exit slit. An image of the exit slit of reduced size is focussed upon the film so that the length of the slit image is in a direction perpendicular to the direction of motion of the film. The total amount of light reaching the film from the ultrasonic light valve is at all times substantially constant. However, as the amount of light reaching one-half of the sound track is increased due to a change in modulating voltage applied to the piezoelectric crystal, the amount of light reaching the other half of the sound track is simultaneously correspondingly decreased, and vice versa, to cause a push-pull, variable density sound record to be produced. While the entrance and exit aperture plates may be interchanged if desired, the arrangement using the single slit exit aperture plate has the advantage that the light beam transmitted through the exit aperture remains relatively narrow over its full length and the image of the exit aperture therefore may easily be condensed to its proper size on the film.

The invention will now be described with reference to the accompanying drawings in which.

Figure 1:
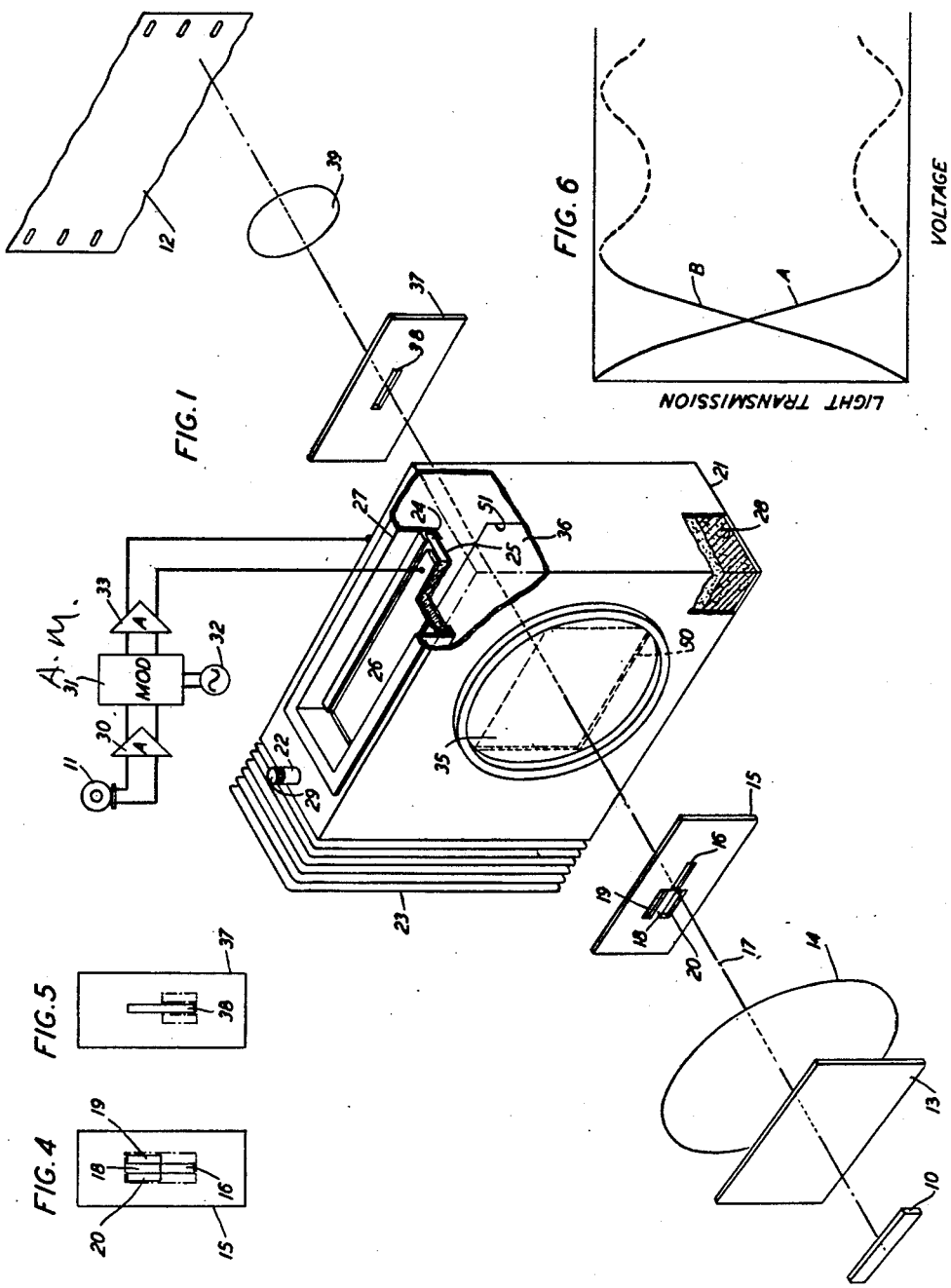
Fig. 1 is a diagrammatic view of a sound recording system embodying the invention.

Figs. 4 and 5 are detailed views taken along the lines 4—4 and 5—5, respectively, of Fig. 2; and Fig. 6 consists of curves to which reference will be made in explaining the operation of the system.

Referring now to the drawings, there is disclosed a sound recording system employing an ultrasonic light valve for modulating light from a source 10 in accordance with sound waves reaching microphone 11 to produce a push-pull, variable density sound record upon the sound track of a motion picture film 12 which is moved continuously past the area at which the film is exposed to the modulated light beam. Light from source 10 is preferably transmitted through a light filter 13 which transmits only a relatively narrow portion of the light spectrum, for example, violet and near ultra-violet light to which the film 12 is most sensitive. A condensing lens 14 directs the light from filter 13 to illuminate the entrance aperture plate 15 of opaque material and having therein a slit aperture 16 extending in one direction from the optical axis 17 and a bar 18 separating two slits 19 and 20 extending in the opposite direction from the optical axis 17. As shown clearly in Fig. 4, the bar 18 is in alignment with the slit 16 and the bar and slit have equal dimensions. The illuminated area of the entrance aperture screen or plate is indicated by the dash-dot line Fig. 4.

The ultrasonic cell comprising a metallic tank 21 which is completely filled with a suitable liquid such as xylol through a short pipe 22 which, after the tank has been filled, is closed by a plug 29. A metallic bellows 23 is provided for closing one end of the tank to permit a volume change of the tank in response to a small change in pressure in the liquid, due to temperature change, for example, as described in my application Serial No. 467,651 filed Dec. 2, 1942. For setting up compressional waves in the liquid of the cell there is provided a piezoelectric driver comprising an X-cut quartz crystal 24 and electrodes 25 and 26 which are preferably formed on the crystal surfaces by plating metal thereon. The electrodes may be formed, if desired, by plating the entire crystal and then removing a portion of the plating by etching to form the opposed electrodes. A rectangular opening is provided at the top of the tank 21 for receiving the piezoelectric driver. The driver may be mounted by soldering a copper foil connecting strip 27 to the plating which forms the inner electrode 25 and to the tank 21, thus sealing the opening in the tank. A suitable substance 28 for absorbing the compressional waves after their transmission through the useful portion of the cell is provided, for example, animal wool embedded in a gelatinous substance, as disclosed in my application Serial No. 467,652 filed Dec. 2, 1942. For energizing the piezoelectric driver, the pick-up microphone 11 is connected through an amplifier 30 to a modulator 31 which is supplied from source 32 with alternating current of a high frequency to which the crystal 24 is resonant and the modulated carrier current from the modulator 31, after being amplified by the amplifier 33, is impressed upon the electrodes 25, 26 of the piezoelectric driver. Spherical lenses 35 and 36 mounted over rectangular openings 50 and 51 in the opposite walls of the tank 21 direct light from the illuminated slit apertures 16, 19 and 20 through the liquid in the cell in rays parallel or nearly parallel to the wave fronts of the compressional waves in the liquid, and thence upon the exit aperture plate 37 having a slit aperture 38 therein. As shown in Fig. 5, the slit aperture 38 has the same dimensions as the bar 18 and slit 16 together of the entrance aperture plate shown in Fig. 4. When the piezoelectric driver is unenergized, the lenses 35 and 36 focus an image of the bar 18 and slit 16 upon the slit 38 of aperture plate 37 so that the transmitted light beam fills one-half of the slit 38 on one side of the optical axis. The half of slit 38 on the other side of the optical axis is not illuminated, the light from slits 19 and 20 respectively of the entrance aperture plate falling just beyond the two sides of the slit 38 as shown by the dash-dot line in Fig. 5. A lens 39 focusses a reduced image of slit 38 upon the sound track portion of the motion picture film 12.

Figure 2:
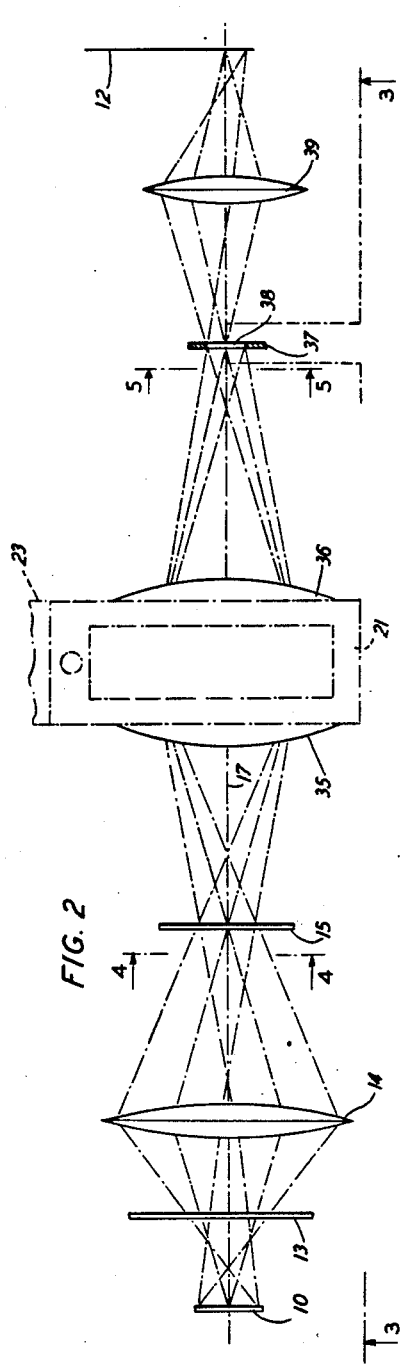
Figs. 2 and 3 are diagrammatic views of the apparatus shown in Fig. 1, Fig. 2 being a plan view partly in section and Fig. 3 being a side elevation partly in section.
Figure 3:
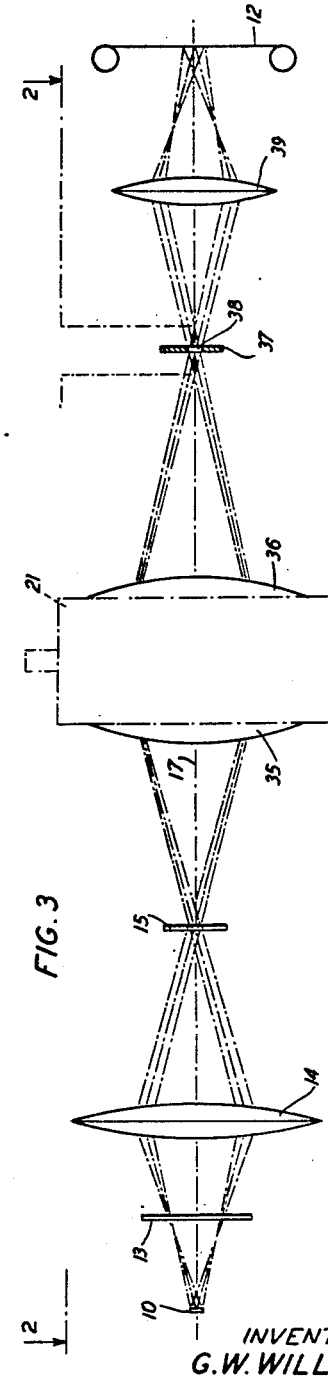

As shown in Figs. 2 and 3, light from the source 10, after being filtered by the filter 13, is directed upon the entrance aperture plate 15 by a lens 14 which focusses an image of the source 10 upon the aperture plate 15. Light which passes through the slits 16, 19 and 20 of entrance aperture plate 15 reaches the lens 35, passes through the ultrasonic cell 21 in rays which are nearly parallel and is then directed by lens 36 to the exit aperture plate 37, the lenses 35 and 36 focussing an image of the slits in the entrance aperture plate 15 upon the exit aperture plate 37. As shown in Figs. 2 and 3, when the ultrasonic cell is unenergized, light coming from the slit 16 in aperture plate 15 (below the optical axis in Fig. 2) reaches the portion of slit 38 in exit aperture plate 37 which is above the optical axis in Fig. 2 and thence passes through slit 38 to reach lens 39 which images the light slit 38 on film 12. For this condition, light from slits 19 and 20 of entrance aperture plate 15 is intercepted by the exit aperture plate 37 and therefore does not reach the film 12. In some cases it may be preferred to employ an additional lens close to the entrance aperture plate 15 for focussing an image of lens 14 on lens 35 and a second additional lens near exit aperture plate 37 for focussing an image of lens 36 on lens 39. It may also be desirable to employ a lens system instead of the single lens 39, as shown in the drawings, for focussing an image of the exit aperture plate 37 upon the film 12.

When the piezoelectric driver 24, 25, 26 is energized, the light passing through the liquid in the cell is diffracted in accordance with the amplitude of the compressional wave set up in the liquid. The portion of the cell between the piezoelectric driver 24, 25, and 26 and the wave absorbing pad 28 through which light is directed is short with respect to a half wave-length in the liquid of the modulating highest frequency component of the modulating signal generated in the circuit including the microphone 11. This highest modulating frequency may be 10 kilocycles and the carrier current source 32 may have a frequency of 10 megacycles, for example. With this modulating frequency, a half wave-length in xylol, in which the wave velocity is approximately 1,300 meters per second, is about 6.5 centimeters. Thus at any instant the amplitude of the compressional wave in the liquid of the ultrasonic cell is representative of the amplitude of the speech or music signal generated in the circuit including the microphone 11 which signal is recorded upon the motion picture film 12.

As the amplitude of the compressional waves in the liquid is increased from zero due to an increase in the alternating voltage impressed upon the electrodes 25, 26, the light passing through the liquid in the cell is diffracted in accordance with the amplitude of the alternating voltage. As a result the diffracted portion of the light from slits 19 and 20 of the entrance aperture plate passes through the portion of slit 38 in exit aperture plate 37 which is below the optical axis as viewed in Fig. 2. At the same time, the diffracted portion of the light from slit 16 of the entrance aperture plate is intercepted by the exit aperture plate 37. The total amount of light passing through the slit 38 in the exit aperture plate and reaching the film 12 remains substantially constant, the amount of diffracted light passing through the portion of the slit 38 below the optical axis in Fig. 2 and reaching the portion of the film 12 above the optical axis being increased and the amount of undiffracted light passing through the portion of slit 38 above the optical axis and reaching the portion of film 12 below the optical axis being decreased simultaneously as the alternating voltage impressed upon the electrodes of the piezoelectric driver 24, 25, 26 is increased. This relationship is graphically illustrated in Fig. 6 in which curve A shows the relationship between the alternating voltage impressed upon the piezoelectric driver and the light transmission to the film for the portion of the light beam which is transmitted through slit 16 and the portion of the slit aperture 38 which is above the optical axis in Fig. 2 while curve B shows this relationship for the portion of the light beam which is transmitted through slits 19 and 20 and the portion of slit 38 which is below the optical axis in Fig. 2. In Fig. 6, the maximum amplitude of the alternating voltage is at a value which lies near the right-hand extremities of the straight portions of the curves lying to the left of this value. A push-pull, variable density sound record is thus produced upon the sound track of motion picture film 12.

What is claimed is:

1. Apparatus for modulating light from a light source under control of a source of signaling electromotive force, comprising an ultrasonic cell in the path of a light beam from said light source having vibrating means for setting up mechanical waves therein under control of the electromotive force of said source of signaling electromotive force, an entrance aperture plate in the path of the light beam entering said ultrasonic cell, an exit aperture plate in the path of the light beam leaving said ultrasonic cell, one of said aperture plates having a slit aperture therein, the other aperture plate having in one portion thereof a slit aperture and in the other portion thereof a bar which separates two apertures, and means in said light path for focussing an image of the slit in said one aperture plate upon the bar and slit of the other aperture plate, or vice versa, when no signaling electromotive force is applied to said ultrasonic cell, the bar and slit and the image focussed thereon being substantially coextensive.

2. Light modulating apparatus comprising an ultrasonic cell in the path of a light beam for diffracting a portion of the light beam transmitted through the cell under control of a compressional wave set up therein, and means in the path of the light beam for transmitting diffracted light from said cell and for simultaneously separately transmitting undiffracted light from said cell.

3. Light modulating apparatus comprising a transparent, compressional wave propagating medium, means for directing a light beam through said medium, means for setting up in said medium compressional waves for diffracting a portion of the light passing through said medium which varies in accordance with the amplitude of said compressional waves, and means for intercepting diffracted light and transmitting undiffracted light of a portion of the emergent light from said medium and for intercepting the undiffracted light and transmitting diffracted light of another portion of said emergent light.

4. Light modulating apparatus comprising a transparent, compressional wave propagating medium, means for directing a light beam through said medium, means for setting up in said medium compressional waves for causing diffraction of the light, the relative amounts of diffracted and undiffracted light emerging from the wave propagating medium varying in accordance with the amplitude of said compressional waves, and means for deriving from said emergent light beam a light beam having only diffracted light and a light beam having only undiffracted light.

5. Apparatus for modulating a light beam comprising means for diffracting the light of said beam in accordance with and under control of signals, and means for deriving from the emergent beam from said light diffracting means two light beams, one having only light which was diffracted in passing through said light diffracting means and the other having only light which was not diffracted in passing through said light diffracting means.

6. Apparatus for modulating a light beam comprising means for diffracting the light of said beam in accordance with and under control of signals, means for deriving from the emergent beam from said light diffracting means two light beams, one having only light which was diffracted in passing through said light diffracting means and the other having only light which was not diffracted in passing through said light diffracting means, and means for receiving both said light beams simultaneously for producing a record of said signals the total amount of light received by said recording means remaining substantially constant and the light of the diffracted and undiffracted beams each varying in response to signal variations.

7. The method of recording signals which comprises diffracting a portion of the light in a light beam in accordance with signals to be recorded and utilizing diffracted and undiffracted light from said beam simultaneously in recording said signals.

8. The method of producing a push-pull signal record which comprises partially diffracting a light beam under the control of signals and simultaneously producing two records of said signals one under control of diffracted light from said beam and the other under control of undiffracted light from said beam.

9. The method of recording signals by means of light which comprises variably diffracting a light beam in accordance with the signals to be recorded, utilizing a diffracted portion of the light beam for producing a record of the signals and simultaneously utilizing an undiffracted portion of the light beam for producing a second record of the signals.

10. The method of recording signals by means of light which comprises variably diffracting a light beam in accordance with signals to be recorded, utilizing a diffracted portion of the light beam for producing a record of the signals and simultaneously utilizing an undiffracted portion of the light beam for producing a second record of the signals, the sum of the undiffracted and diffracted portions of the light beam which are used for recording being substantially constant so that the second record is complementary with respect to the first.

11. The method of recording signals upon a light sensitive film which comprises directing a substantially fixed amount of light on the film while the film is in motion, causing the light directed upon one portion of the film to be diffracted while the light directed upon another portion is undiffracted, and varying the ratio of diffracted to undiffracted light in accordance with the signals to be recorded.

12. The method of recording signals upon a light sensitive film which comprises moving the film, diffracting light under control of a signaling electromotive force to produce a light beam of which the ratio of diffracted to undiffracted light varies in accordance with the amplitude variations of the signaling electromotive force, and separately simultaneously utilizing the diffracted and the undiffracted portions of the light beam to produce two variable density records upon said film of which the density of one increases with increasing signaling electromotive force and the density of the other decreases with increasing signaling electromotive force.

13. Apparatus for modulating light from a light source comprising a first aperture plate for transmitting a portion of the light from said source, a transparent medium through which is transmitted light from said first aperture plate, vibratory means for setting up compressional waves in said medium to cause light therein to be diffracted, the amount of light which is diffracted varying in accordance with the amplitude of said compressional waves, a source of varying electromotive force for controlling the vibration of said vibratory means, a second aperture plate for transmitting a portion of the light which is transmitted through said medium, a portion of the diffracted light and a portion of the undiffracted light being intercepted by said second aperture plate, and means including said aperture plates for causing diffracted light only to pass through one portion of said second aperture plate and for causing undiffracted light only to pass through another portion of said second aperture plate.

14. Apparatus in accordance with claim 13 in which the first aperture plate has a plurality of light transmitting apertures therein and the second aperture plate has a single light transmitting aperture therein.

15. Apparatus for producing a push-pull, variable density signal record upon a continuously moving light sensitive film comprising an ultrasonic cell in the path of light from said source, a source of signaling electromotive force for energizing said ultrasonic cell, an entrance aperture plate in the light path between said source and said cell, one portion of said entrance aperture plate having two light transmitting apertures separated by a bar and another portion having a slit aperture in alignment with said bar, said slit and bar having substantially equal dimensions, an exit aperture plate in the light path between said ultrasonic cell and the light sensitive film, said exit aperture plate having a slit aperture, means for focussing an image of said bar and slit of said entrance aperture plate upon the slit of said exit aperture plate when no signaling electromotive force is impressed upon said ultrasonic cell, and means for focussing an image of the slit in said exit aperture plate upon said light sensitive film.

16. Ultrasonic light modulating means comprising a transparent medium through which compressional waves may be propagated for causing diffraction of light, the amount of diffracted light increasing and the amount of undiffracted light decreasing as the amplitude of said compressional waves is increased, and vice versa, light sensitive means, and means for directing a light beam through said medium to said light sensitive means and for intercepting a portion of the diffracted light and a portion of the undiffracted light so that one portion of said light sensitive means is illuminated only by diffracted light while another portion is simultaneously illuminated only by undiffracted light.

GERALD W. WILLARD.